(12) United States Patent
Vesely et al.

(10) Patent No.: US 11,399,401 B2
(45) Date of Patent: Jul. 26, 2022

(54) HANDLING DUAL CONNECTIVITY IN NEW RADIO

(71) Applicant: Telefonaktiebolaget LM Ericsson (publ), Stockholm (SE)

(72) Inventors: Alexander Vesely, Feldbach (AT); Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 16/648,840

(22) PCT Filed: Sep. 28, 2018

(86) PCT No.: PCT/IB2018/057557
§ 371 (c)(1),
(2) Date: Mar. 19, 2020

(87) PCT Pub. No.: WO2019/064256
PCT Pub. Date: Apr. 4, 2019

(65) Prior Publication Data
US 2020/0252985 A1     Aug. 6, 2020

Related U.S. Application Data

(60) Provisional application No. 62/566,175, filed on Sep. 29, 2017.

(51) Int. Cl.
*H04W 4/00* (2018.01)
*H04W 76/15* (2018.01)
(Continued)

(52) U.S. Cl.
CPC ............ *H04W 76/15* (2018.02); *H04W 76/11* (2018.02); *H04W 76/12* (2018.02)

(58) Field of Classification Search
CPC ...... H04W 88/06; H04W 76/01; H04W 76/22
See application file for complete search history.

(56) References Cited

U.S. PATENT DOCUMENTS

2020/0053814 A1\* 2/2020 Minokuchi ........... H04W 28/10
2021/0235314 A1\* 7/2021 Huang ................ H04W 28/12

FOREIGN PATENT DOCUMENTS

| WO | WO 2015/118037 A1 | 8/2015 |
|----|-------------------|--------|
| WO | WO 2016/114623 A1 | 7/2016 |

OTHER PUBLICATIONS

International Search Report and Written Opinion dated Feb. 20, 2019 for PCT/IB2018/057557, 25 pages.
(Continued)

*Primary Examiner* — Omoniyi Obayanju
(74) *Attorney, Agent, or Firm* — Sage Patent Group

(57) ABSTRACT

A method of operating a network node to provide dual connectivity in a new radio telecommunications system. The method allocates two tunnel endpoint identifiers (TEIDs). The method sends the allocated TEIDs to at least one other network node for transporting a Protocol Data Unit (PDU) session that can be split. The method receives two TEIDs for a master node and a secondary node (SN). A related method of operating a master node provides dual connectivity. The method sends a SN addition request message to a SN. The method sends a SN add/modify completion indication to the SN that informs the SN that the operations to add/modify are complete.

8 Claims, 5 Drawing Sheets

(51) Int. Cl.
 *H04W 76/12* (2018.01)
 *H04W 76/11* (2018.01)

(56) References Cited

OTHER PUBLICATIONS

International Preliminary Report on Patentability dated Nov. 13, 2019 for PCT/IB2018/057557, 18 pages.
Nokia et al., "Allowing Mapping of Default Bearer on SCG During Initial Context Setup", 3GPP Draft; R2-1706858, vol. RAN WG2, Qingdao, China, Jun. 26, 2017, 2 pages.
"3rd Generation Partnership Project; Technical Specification Group Radio Access Network; Evolved Universal Terrestrial Radio Access (E-UTRA) and NR; Multi-connectivity; Stage 2 (Release 15)", 3GPP Draft; 37340-101, Sep. 12, 2017, 44 pages.
ZTE Corporation (Rapporteur): "Initial TP for MN/SN Procedures for MR-DC with 5GC", 3GPP Draft; R3-172642 Stage 2 TP for MR-DR@5GC Procedures, vol. RAN WG3, Qingdao, China, Jun. 29, 2017, 10 pages.
Ericsson, "PDU Session Split at UPF", 3GPP Draft; R3-173953, vol. RAN WG3, Prague, Czech Republic, Sep. 30, 2017, 10 pages.
Ericsson, "MN and SN Role for QoS Flow to DRB Mapping", 3GPP Draft; R3-173952, vol. RAN WG3, Prague, Czech Republic, Sep. 30, 2017, 14 pages.
Ericsson, VODAFONE, "Bearers for Dual Connectivity—Bearer Harmonisation", 3GPP Draft; R3-174744, vol. RAN WG3, Reno, Nevada, US, Nov. 18, 2017, 8 pages.

\* cited by examiner

| IE/Group Name | Presence | Range | IE type and reference | Semantics description | Criticality | Assigned Criticality |
|---|---|---|---|---|---|---|
| PDU Session Resource Aggregated Maximum Bit Rate | M | | <ref> | | - | |
| Transport Layer Information | M | | 9.3.2.2 | | - | |
| Additional Transport Layer Information | O | | 9.3.2.2 | 5GC Transport Layer Address for split PDU session in S-NG-RAN node | - | |
| PDU Session Type | M | | <ref> | eNote: IP, unstructured or Ethernet | - | |
| QoS Flows Setup List | M | | | | - | |
| >QoS Flows Setup Item IEs | | 1..<maxno ofQoSFlo ws> | | | - | |
| >>QoS Flow Indicator | M | | <ref> | | EACH | reject |
| >>QoS Flow Level QoS Parameters | O | | 9.3.1.23 | | EACH | reject |

Figure 4

HANDLING DUAL CONNECTIVITY IN NEW RADIO

CROSS REFERENCE TO RELATED APPLICATIONS

This application is a 35 U.S.C. § 371 national stage application of PCT International Application No. PCT/IB2018/057557 filed on Sep. 28, 2018, which in turn claims domestic priority to U.S. Provisional Patent Application No. 62/566,175 filed on Sep. 29, 2017, the disclosures and content of which are incorporated by reference herein in their entirety.

TECHNICAL FIELD

The present disclosure relates to methods and operations by network nodes and user equipments in a wireless communications system.

BACKGROUND

The 3GPP release 15 introduces New Radio (NR) and the dual connectivity from the early releases is expanded to cover the dual connectivity between a Long-Term Evolution (LTE) node and NR node, or between two NR nodes, such as shown in FIG. 1. Further one Protocol Data Unit (PDU) session may be split in User Plane Function (UPF), so one part of the PDU session goes via one node and the rest of the PDU session goes via another node. The security keys of the Master Cell Group (MCG) bearer, Split bearer, and SCG bearer are configurable per bearer. For example, the security keys may comprise a eNB key (KeNB) or a secondary eNB key (S-KeNB).

With NR, the PDU session contains Quality of Service (QoS) flows. The QoS flows are mapped by the Radio Access Network (RAN) into radio bearers, there will be no one to one mapping.

Potential Problems with Existing Solutions

The current Dual Connectivity is built on the assumption that a single Service Data Adaptation Protocol/Packet Data Convergence Protocol (SDAP/PDCP) entity exists per PDU session. The PDU session is only split in RAN, but not in user-plane function (UPF). This has to be changed now so that two SDAP/PDCP entities, one in each node may exist simultaneously.

Further it is not clear which RAN will decide the mapping of the QoS flows to radio bearers in case of Dual Connectivity and how such mapping would be decided.

One related problem is how to handle the situation when the Master NG-RAN node (M-NG-RAN) node decides to offer resources to the Secondary NG-RAN node (S-NG-RAN) for handling of flows assigned to the SDAP entities hosted by the S-NG-RAN.

SUMMARY

According to some embodiments of inventive concepts, a method of operating a network node to provide dual connectivity in a new radio telecommunications system is provided. The method includes allocating two tunnel endpoint identifiers (TEIDs). The method also includes sending the allocated TEIDs to at least one other network node for transporting a Protocol Data Unit (PDU) session that can be split. The method further includes receiving two TEIDs for a master node and a secondary node.

A potential advantage of these and other embodiments disclosed herein is that it is operationally possible to use a Master Cell Group resource when a single Service Data Adaptation Protocol/Packet Data Convergence Protocol (SDAP/PDCP) is located in a Secondary NG-RAN (S-NG-RAN) node. Another potential advantage of these and other embodiments disclosed herein is that the PDU session may be split in both the RAN and in the UPF. A further potential advantage of these and other embodiments disclosed herein is that two SDAP/PDCP entities, one in each node, may exist simultaneously.

Some other embodiments are directed to a network node for providing dual connectivity in a new radio telecommunications system. The network node is configured to allocate two TEIDs, send the allocated TEIDs to at least other network node for transporting a PDU session that can be split, and receive two TEIDs for a master node and a secondary node.

According to some other embodiments of inventive concepts, a method of operating a master node provides dual connectivity is provided. The method includes sending a secondary node addition request message to a secondary node, SN. The method further includes sending a SN add/modify completion indication to the SN that informs the SN that the operations to add/modify are complete.

Some other embodiments are directed to a master node that provides dual connectivity. The master node is configured to send a secondary node addition request message to as secondary node (SN) and send a SN add/modify completion indication to the SN that informs the SN of that the operations to add/modify are complete.

According to some other embodiments of inventive concepts, a method of operating a master node to provide dual connectivity is provided. The method includes receiving two tunnel point identifiers, TEIDs, in a request for a PDU session that can be split. The method also includes allocating a TEID for a master node and receiving a TEID allocated by a secondary node to transport the PDU session. The method further includes sending the allocated TEIDs to the core network.

Some other embodiments are directed to master node that provides dual connectivity. The master node is configured to receive two tunnel point identifiers, TEIDs, in a request for a PDU session that can be split. The master node is also configured to allocate a TEID for a master node and receive a TEID allocated by a secondary node to transport the PDU session. The master node is further configured to send the allocated TEIDs to the core network.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 4 illustrates a table of information elements (IEs) used for a PDU Session Setup Request Transfer in accordance with some embodiments of the inventive concepts described herein;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Various embodiments of the present disclosure are directed to performing QoS flow to data radio bearer (DRB) mapping if the Service Data Adaptation Protocol (SDAP) is hosted in the S-NR-RAN NODE, and the master node (MN) may provide the share it is willing to take with master cell group (MCG) resources for the overall QoS that is required. The S-NG-RAN node decides how the QoS flow should be mapped, and the M-NG-RAN node informs the S-NG-RAN node of information related to the completion, e.g. informs the S-NG-RAN node of the transport layer address. The M-NG-RAN node informs the S-NG-RAN node that the MCG resource addition is completed and provides back the needed information which can include, for example, the transport layer address.

Figure 1:
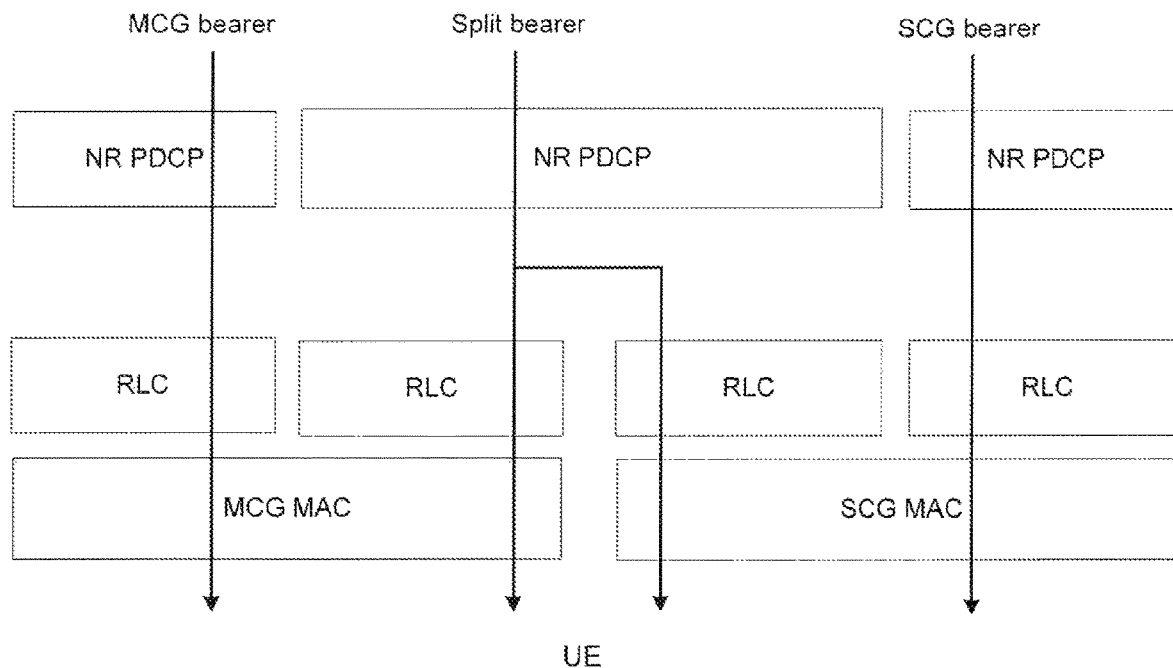
FIG. 1 illustrates a block diagram dual connectivity between a LTE node and a NR node, or between two NR nodes in accordance with some embodiments of the inventive concepts described herein.
Figure 2:
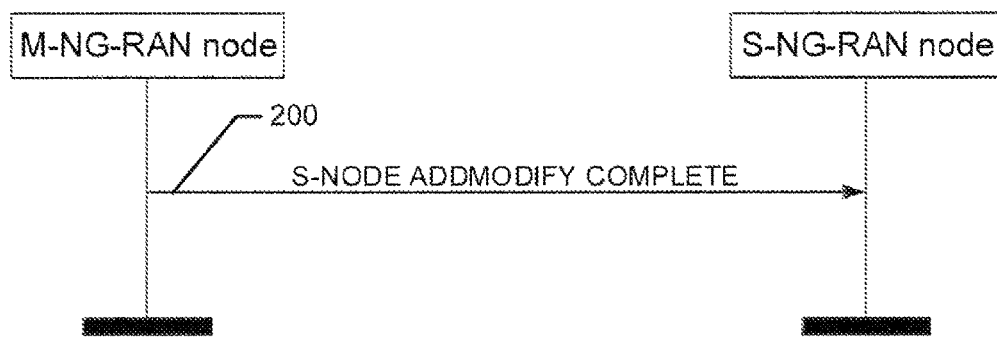
FIG. 2 illustrates a data flow diagram of a new message that is sent by a M-NG-RAN node to inform a S-NG-RAN node of a success operation of a S-NG-RAN node addition completion procedure in accordance with some embodiments of the inventive concepts described herein.

FIG. 2 shows a new message that is sent by the M-NG-RAN node to inform the S-NG-RAN node of success operation of the S-NG-RAN node addition completion procedure. The purpose of the S-NG-RAN node addition completion procedure is to complete, if applicable, the setup Xn-U transport bearers. The procedure can use UE-associated signaling.

Referring to FIG. 2, the M-NG-RAN node sends (step 200) a S-NODE ADDMODIFY COMPLETE message to the S-NG-RAN node that informs the S-NG-RAN node that the operations to add/modify (add and/or modify) are complete. The message can further contain information that informs the S-NG-RAN node of the transport layer address. The S-NODE ADDMODIFY COMPLETE message may contain a Xn-U GTP-U tunnel endpoint information to complete the Xn-U tunnel establishment for DRBs for which the NR PDCP entity is hosted by the S-NG-RAN node. The operations of FIG. 2 may be used for TS 38.423.

Figure 3:
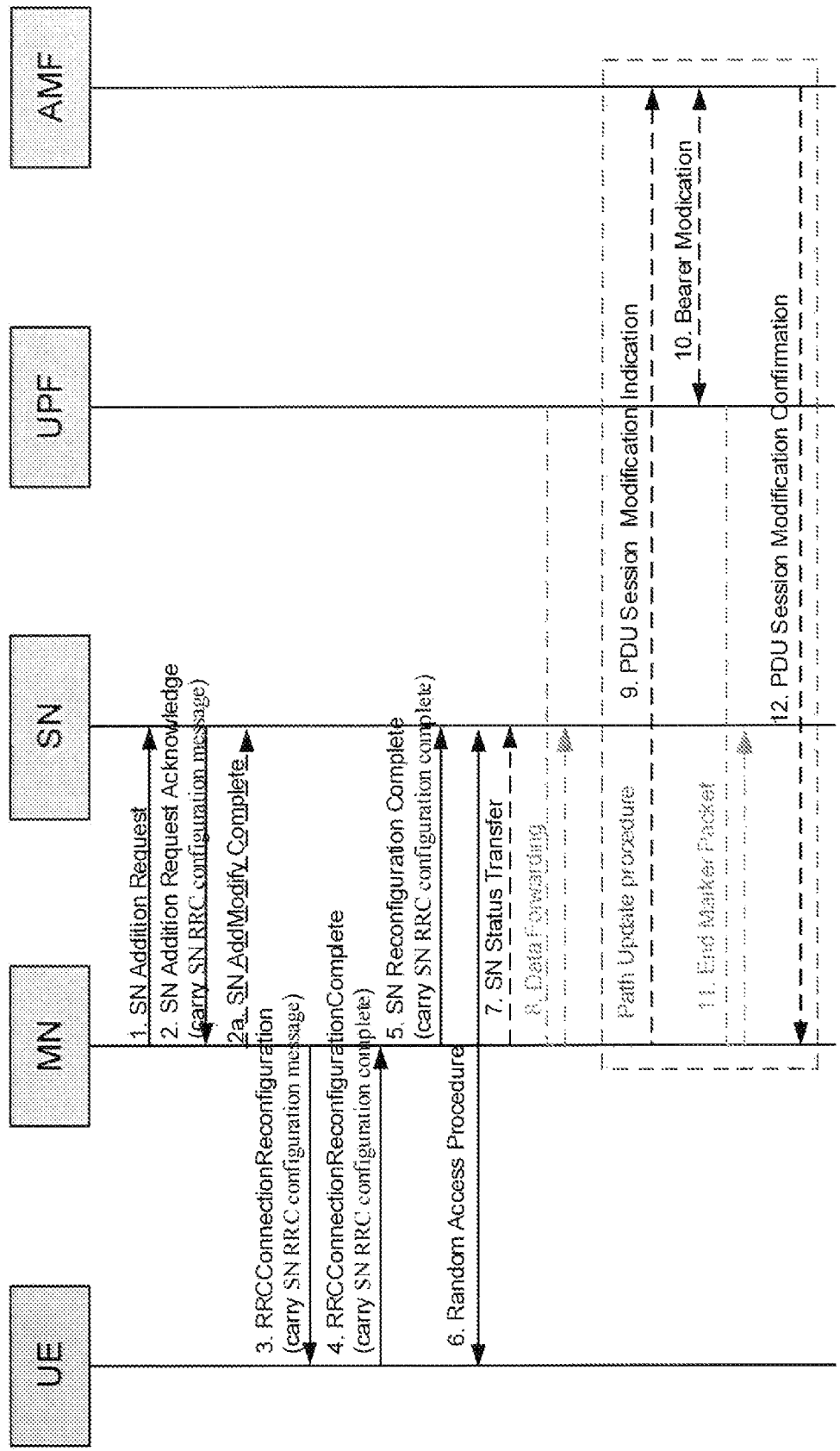
FIG. 3 illustrates a combined data flow diagram and flowchart of operations of a method of operating a network node to provide dual connectivity in a new radio telecommunications system in accordance with some embodiments of the inventive concepts described herein.

FIG. 3 shows a combined data flow diagram and flowchart of operations by a user equipment (UE), MN, SN, UPF, and AMF in accordance with some embodiments. Referring to FIG. 3, the data flow diagram and flowchart illustrate how the new message operationally functions in the procedure to "add S-NG-RAN node." The operations of FIG. 3 may be used for TS 37.340.

In step 1, the MN sends a SN addition request to the SN, which responds in step 2 with a SN addition request acknowledgment (e.g., carried in a SN RRC configuration message) to the MN. In step 2a, the MN sends a SN add/modify completion indication to the SN. If in step 2a, the MN needs to complete the setup of Xn-U transport resources towards the SN, it sends the SN AddModify Complete message to the SN.

In step 3, the MN sends a RRCConnectionReconfiguration indication (e.g., carried in a SN RRC configuration message) to the UE. In step 4, the UE responds with a RRCConnectionReconfigurationComplete indication (e.g., carried in a SN RRC configuration complete message).

In step 5, the MN sends a SN Reconfiguration Complete indication (e.g., carried in a SN RRC configuration complete message) to the SN. In step 7, the SN and the UE perform the Random Access Procedure.

In step 8, the UPF forwards data through the MN to the SN.

Steps 9, 10, 11, and 12 perform a path update procedure. In step 9, The MN sends a PDU session modification indication to the Access and Mobility Management Function (AMF). In step 10, the AMF responsively sends a bearer modification indication to the UPF. In step 11, the UPF responsively sends an end marker packet indication to the MN, which sends it to the SN. In step 12, the AMF sends a PDU session modification confirmation indication to the MN.

Various embodiments of the present disclosure are further directed to operations for PDU session splitting at the UPF.

For one tunnel, one end is in UPF and the other end is in the NG-RAN node. Two tunnels are needed when split in UPF. In some embodiments, the UPF first pre-allocates two tunnel endpoint identifiers (TEIDs), which it sends to the RAN. The RAN then, after processing, sends back the TEIDs at the RAN side, one for the master node (MN) and the other for the secondary node (SN). The RAN also knows by then the TEID at the UPF side. A 5G Core Network (5GC) can operate to allocate 2 TEIDs and, when a RAN does not perform splitting, the 5GC can responsively release one of the two TEIDs.

In some embodiments, a 5GC provides to the M-NG-RAN node two sets of transport layer information (e.g. Transport Layer Address, GTP-U TEIDs) for the PDU sessions for which UPF splitting should be supported. The M-NG-RAN node operates to perform the UPF splitting of the PDU sessions. The M-NG-RAN node sends feedback on the PDU session splitting information and the transport layer information for, or of, the master node (MN) and the S-NG-RAN node. In one embodiment, the additional transport layer information for the S-NG-RAN node is provided by the 5GC in a PDU session resource setup request and/or in by the 5GC in a PDU session resource modification request, such as shown in FIG. 4.

FIG. 4 illustrates a table of information elements (IEs) used for PDU Session Setup Request Transfer, which may include step 9 in FIG. 3. Any one or more of the IEs can be transparent to the AMF. In one embodiment, the Additional Transport Layer Information IE is a 5GC transport layer address for a split PDU session in the S-NG-RAN node. The PDU session type IE embodiment, the Additional Transport Layer Information IE may also be transparent to the AMF. In this or another embodiment, the PDU Session Type IE can indicate whether the session is IP unstructured or structured, e.g., Ethernet. The IEs in FIG. 4 may be used in TS 38.413. The IEs in FIG. 4 may also be used for TS 37.340.

In some alternative or additional embodiments, a 5GC operates to provide to a M-NG-RAN node information directed to how the QoS flows in the PDU session should be split, and also provides the transport layer information. The M-NG-RAN node can operate to decide the final split and inform, e.g., to the 5GC, of the PDU session splitting information and the transport layer information for, or of, the M-NG-RAN node and the S-NG-RAN node.

In some alternative or additional embodiments, a M-NG-RAN node operates to decide and inform the 5GC that the PDU session will be split in UPF. The 5GC then provides the transport layer information for the S-NG-RAN node afterwards.

Potential Advantage

A potential advantage of these and other embodiments disclosed herein is that it is operationally possible to use the MCG resource when SDAP/PDCP is located in the S-NG-RAN node.

Terminology

In some embodiments, a more general term "network node" is used and it can correspond to any type of radio network node or any network node, which communicates with a UE and/or with another network node. Examples of network nodes are MN, SN, UPF, and AMF. Example network nodes may further include NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, etc.

In some embodiments, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

In some embodiments, the non-limiting term WAN (wireless access network or RAN, radio access network) node is used. The WAN node can be a UE (e.g. D2D UE) or a network node (e.g. access point, BS etc.). The WAN node is also interchangeably called as cellular node, NW source node etc.

The term time resource used herein may correspond to any type of physical resource or radio resource expressed in terms of length of time. Examples of time resources are: symbol, time slot, subframe, radio frame, TTI, interleaving time etc.

The embodiments are described for 5G. However, the embodiments are applicable to any Radio Access Technology (RAT) or multi-RAT systems, where the UE receives and/or transmit signals (e.g. data) e.g. LTE FDD/TDD, WCDMA/HSPA, GSM/GERAN, Wi Fi, WLAN, CDMA2000, 5G, NR, etc.

Figure 5:
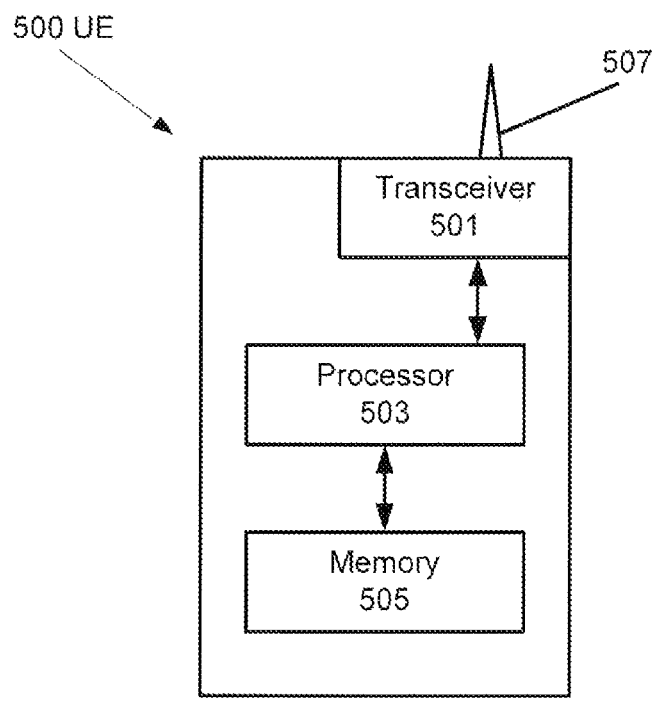
FIG. 5 illustrates a block diagram illustrating elements of a user equipment (UE) configured to operate according to embodiments of the inventive concepts described herein.

Example Elements of UE and Network Node:

FIG. 5 is a block diagram illustrating elements of a UE 500 (also referred to as a wireless terminal, a wireless communication device, a wireless communication terminal, user equipment, a user equipment node/terminal/device, etc.) configured to operate according to embodiments disclosed herein. As shown, the UE 500 may include an antenna 507, and a transceiver circuit 501 (also referred to as a transceiver) including a transmitter and a receiver configured to provide uplink and downlink radio communications with a base station of a radio access network. The UE 500 may also include at least one processor circuit 503 (also referred to as a processor) coupled to at least one transceiver circuit 501 (also referred to as a transceiver), and at least one memory circuit 505 (also referred to as memory) coupled to the processor circuit. The memory 505 may include computer readable program code that when executed by the processor 503 causes the processor 53 to perform operations according to embodiments disclosed herein for a UE. According to other embodiments, processor 503 may be defined to include memory so that a separate memory circuit is not required. The UE 500 may also include an interface (such as a user interface) coupled with processor 503.

As discussed herein, operations of the UE 500 may be performed by processor 503 and/or transceiver 501. Moreover, modules may be stored in memory 505, and these modules may provide instructions so that when instructions of a module are executed by processor 503, processor 503 performs respective operations according to one or more embodiments herein.

Figure 6:
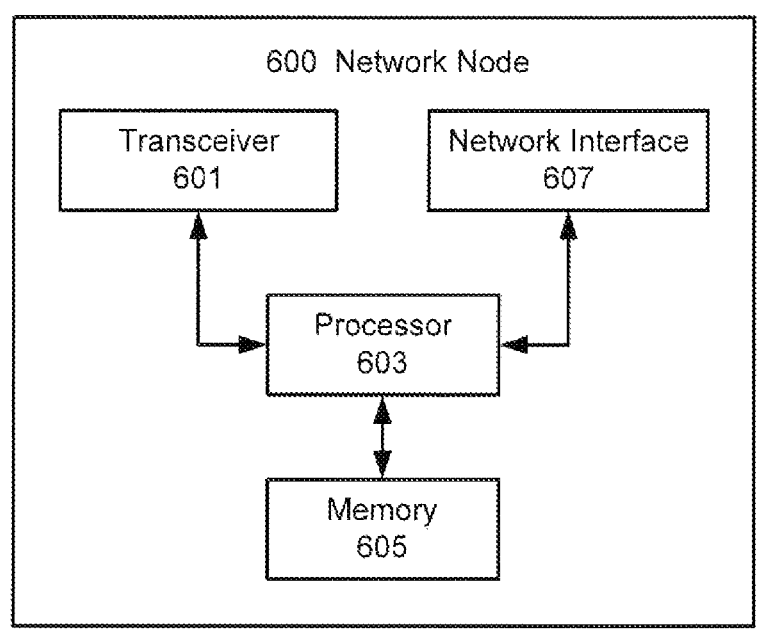
FIG. 6 illustrates a block diagram illustrating elements of a network node configured to operate according to one or more embodiments of the inventive concepts described herein.

FIG. 6 is a block diagram illustrating elements of a network node 600 which may correspond to any one or more of the MN, SN, UPF, and AMF configured to operate according to one or more embodiments disclosed herein. As shown, the network node 600 may include at least one transceiver circuit 601 (also referred to as a transceiver) including a transmitter and a receiver configured to provide uplink and downlink radio communications with UEs. The network node 600 may include at least one network interface circuit 607 (also referred to as a network interface) configured to provide communications with other network nodes. The network node 600 may also include at least one processor circuit 603 (also referred to as a processor) coupled to the transceiver 601, and at least one memory circuit 605 (also referred to as memory) coupled to the processor 603. The memory 605 may include computer readable program code that when executed by the processor 603 causes the processor 603 to perform operations according to embodiments disclosed herein for a network node. According to other embodiments, processor 603 may be defined to include memory so that a separate memory circuit is not required.

As discussed herein, operations of the network node 600 may be performed by processor 603, network interface 607, and/or transceiver 601. For example, processor 603 may control transceiver 601 to transmit communications through transceiver 601 over a radio interface to one or more UEs and/or to receive communications through transceiver 601 from one or more UEs over a radio interface. Similarly, processor 603 may control network interface 607 to send communications through network interface 607 to one or more other network nodes and/or to receive communications through network interface 607 from one or more other network nodes. Moreover, modules may be stored in memory 605, and these modules may provide instructions so that when instructions of a module are executed by processor 603, processor 603 performs respective operations (e.g., operations discussed below with respect to example embodiments of network nodes).

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

Operational Embodiments

Figure 7:
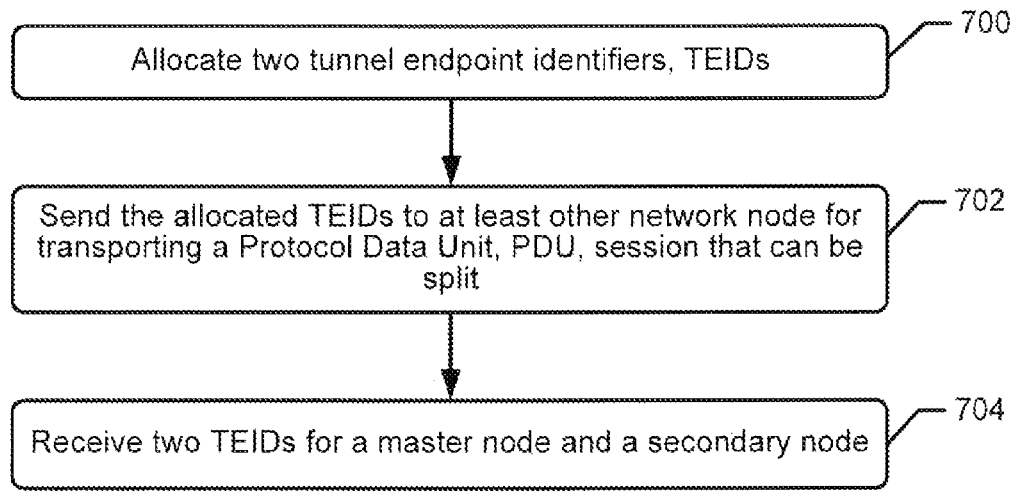
FIG. 7 illustrates a flowchart of operations performed by a network node to provide dual connectivity in a new radio telecommunications system in accordance with some embodiments of the inventive concepts described herein.

FIG. 7 is a flowchart of operations that can be performed by a network node to provide dual connectivity in a new radio telecommunications system in accordance with some embodiments. Referring to FIG. 7, the network node allocates 700 two tunnel endpoint identifiers, TEIDs. The network node sends 702 the allocated TEIDs to at least other network node for transporting a Protocol Data Unit, PDU, session that can be split. The network node receives 704 two TEIDs for a master node and a secondary node.

The network node may be a User Plane Function, UPF. The network node may further operation to, responsive to determining that the allocated TEIDs have not been used for transport of a split PSU session, release one of the two TEIDs for use for transporting another PDU session. The allocated TEIDs may be GTP-U TEIDs, and the allocated TEIDs may be sent to a master node, which may be a Master NG-RAN node.

Figure 8:
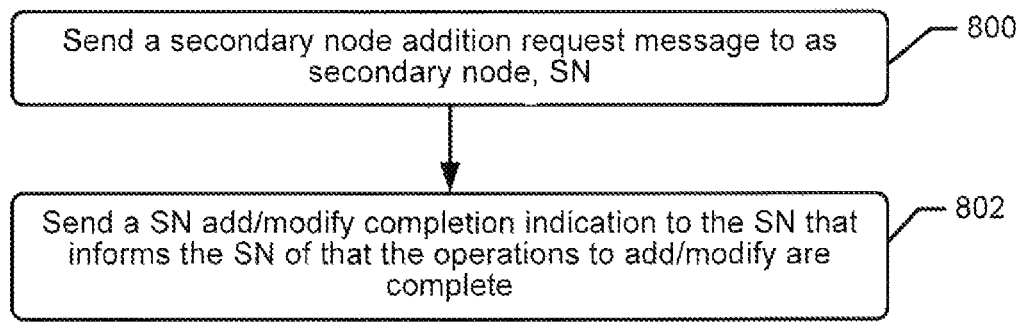
FIG. 8 illustrates a flowchart of operations performed by a master node to provide dual connectivity in accordance with some embodiments of the inventive concepts described herein.

FIG. 8 is a flowchart of operations that can be performed by a master node to provide dual connectivity in accordance with some embodiments. Referring to FIG. 8, the master node sends 800 a secondary node addition request message to as secondary node, SN. The master node then sends 802 a SN add/modify completion indication to the SN that informs the SN of that the operations to add/modify are complete.

The SN add/modify completion indication may inform the SN that a Master Cell Group resource addition is complete. The SN add/modify completion indication may inform the SN of a transport layer address associated with the Master Cell Group resource that was added. The SN add/modify completion indication may be a S-NODE ADD-MODIFY COMPLETE message. The S-NODE ADD-MODIFY COMPLETE message may contain a Xn-U GTP-U tunnel endpoint information to complete Xn-U tunnel establishment for Data Radio Bearers for which New Radio Packet Data Convergence Protocol is hosted by the secondary node. The secondary node may be a Secondary NG-RAN node.

Abbreviations

At least some of the following abbreviations may be used in this disclosure. If there is an inconsistency between abbreviations, preference should be given to how it is used above. If listed multiple times below, the first listing should be preferred over any subsequent listing(s).

Primary Abbreviations

5GC 5G Core Network
AMF Access and Mobility Management Function
DC Dual Connectivity
DRB Data Radio Bearer
PDCP Packet Data Convergence Protocol
PDU Protocol Data Unit
MCG Master Cell Group
MN Master Node (M-NG-RAN node)
M-NG-RAN node Master NG-RAN node
NR New Radio, 5G
SDAP Service Data Adaptation Protocol
SN Secondary Node (S-NG-RAN node)
S-NG-RAN node Secondary NG-RAN node
UPF User Plane Function Secondary Abbreviations 1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further Definitions and Embodiments In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

LISTING OF EMBODIMENTS

Embodiment 1

A method of operating a network node to provide dual connectivity in a new radio telecommunications system, the method comprising:
  allocating (700) two tunnel endpoint identifiers, TEIDs;
  sending (702) the allocated TEIDs to at least other network node for transporting a Protocol Data Unit, PDU, session that can be split; and
  receiving (704) two TEIDs for a master node and a secondary node.

Embodiment 2

The method of Embodiment 1, wherein the network node comprises a User Plane Function, UPF.

Embodiment 3

The method of any of Embodiments 1 to 2, further comprising:

responsive to determining that the allocated TEIDs have not been used for transport of a split PSU session, releasing one of the two TEIDs for use for transporting another PDU session.

Embodiment 4

The method of any of Embodiments 1 to 3, wherein:
the allocated TEIDs comprise GTP-U TEIDs; and
the allocated TEIDs are sent to a master node.

Embodiment 5

The method of Embodiment 4, wherein the master node is a Master NG-RAN node.

Embodiment 6

A computer program product comprising a non-transitory computer readable medium storing program code that when executed by a processor of the network node causes the network node to perform operations of the method of any of Embodiments 1-5.

Embodiment 7

A network node adapted to perform the method of any of Embodiments 1-5.

Embodiment 8

A network node for providing dual connectivity in a new radio telecommunications system, the network node configured to:
allocate two tunnel endpoint identifiers, TEIDs;
send the allocated TEIDs to at least other network node for transporting a PDU session that can be split; and
receive two TEIDs for a master node and a secondary node.

Embodiment 9

The network node of Embodiment 8 further configured to perform the method of any of Embodiments 2-5.

Embodiment 10

A method of operating a master node to provide dual connectivity, the method comprising:
sending (800) a secondary node addition request message to as secondary node, SN;
sending (802) a SN add/modify completion indication to the SN that informs the SN of that the operations to add/modify are complete.

Embodiment 11

The method of Embodiment 10, wherein the SN add/modify completion indication informs the SN that a Master Cell Group resource addition is complete.

Embodiment 12

The method of Embodiment 11, wherein the SN add/modify completion indication informs the SN of a transport layer address associated with the Master Cell Group resource that was added.

Embodiment 13

The method of any of Embodiments 10 to 12, wherein the SN add/modify completion indication is a S-NODE ADD-MODIFY COMPLETE message.

Embodiment 14

The method of Embodiment 13, wherein the S-NODE ADDMODIFY COMPLETE message contains a Xn-U GTP-U tunnel endpoint information to complete Xn-U tunnel establishment for Data Radio Bearers for which New Radio Packet Data Convergence Protocol is hosted by the secondary node.

Embodiment 15

The method of any of Embodiments 10 to 14, wherein the secondary node is a Secondary NG-RAN node.

Embodiment 16

A computer program product comprising a non-transitory computer readable medium storing program code that when executed by a processor of the master node causes the master node to perform operations of the method of any of Embodiments 10-15.

Embodiment 17

A master node adapted to perform the method of any of Embodiments 10-15.

Embodiment 18

A master node to provide dual connectivity, the master node configured to:
send a secondary node addition request message to a secondary node, SN;
send a SN add/modify completion indication to the SN that informs the SN of that the operations to add/modify are complete.

Embodiment 19

The master node of Embodiment 18 further configured to perform the method of any of Embodiments 11-15.

The invention claimed is:
1. A method of operating a core network node to provide dual connectivity in a new radio telecommunications system, the method comprising:
allocating a Tunnel Endpoint Identifier, TEID, for a master node;
receiving another TEID allocated by a secondary node;
splitting a Protocol Data Unit, PDU, session;
transporting one of the split PDU session by using the TEID and the another TEID; and
responsive to determining that the TEID and the another TEID have not been used to transport the one of the split PDU session, releasing one of the TEID and the another TEID and transporting another one of the split PDU session by using the one of the TEID and the another TEID.

2. The method of claim 1, wherein the core network node comprises a 5G core network node.

3. The method of claim 1, wherein: the allocated TEIDs comprise GTP-U TEIDs.

4. The method of claim 1, wherein the master node is a Master NG-RAN node, and the secondary node is a secondary NG-RAN node.

5. A core network node for providing dual connectivity in a new radio telecommunications system, the core network node configured to:
   allocate a Tunnel Endpoint Identifier, TEID, for a master node;
   receive another TEID allocated by a secondary node;
   split a Protocol Data Unit, PDU, session;
   transport one of the split PDU session by using the TEID and the another TEID; and
   responsive to determining that the TEID and the another TEID have not been used to transport the one of the split PDU session, release one of the TEID and the another TEID and transport another one of the split PDU session by using the one of the TEID and the another TEID.

6. The core network node of claim 5, wherein the core network node comprises a 5G core network node.

7. The core network node of claim 5, wherein: the allocated TEIDs comprise GTP-U TEIDs.

8. The core network node of claim 5, wherein the master node is a Master NG-RAN node, and the secondary node is a secondary NG-RAN node.

\* \* \* \* \*